United States Patent
Guzzetta

(10) Patent No.: US 9,902,241 B2
(45) Date of Patent: Feb. 27, 2018

(54) GOLF CART ENCLOSURE

(71) Applicant: Fifon, Inc., Fort Meyers, FL (US)

(72) Inventor: Alfred M. Guzzetta, Fort Meyers, FL (US)

(73) Assignee: Fifon, Inc., Fort Myers, FL (US)

( * ) Notice: Subject to any disclaimer, the term of this patent is extended or adjusted under 35 U.S.C. 154(b) by 0 days.

(21) Appl. No.: 15/353,360

(22) Filed: Nov. 16, 2016

(65) Prior Publication Data

US 2017/0057331 A1 Mar. 2, 2017

Related U.S. Application Data

(63) Continuation of application No. 14/733,322, filed on Jun. 8, 2015, now Pat. No. 9,527,374, which is a continuation of application No. 14/516,024, filed on Oct. 16, 2014, now Pat. No. 9,050,879.

(60) Provisional application No. 61/891,614, filed on Oct. 16, 2013.

(51) Int. Cl.
*B60J 5/06* (2006.01)
*B60J 5/04* (2006.01)
*B60J 11/00* (2006.01)
*B60J 11/06* (2006.01)

(52) U.S. Cl.
CPC ............ *B60J 5/065* (2013.01); *B60J 5/0487* (2013.01); *B60J 11/00* (2013.01); *B60J 11/06* (2013.01)

(58) Field of Classification Search
CPC ... B60J 5/065; B60J 11/06; B60J 11/00; B60J 5/0487

USPC .......... 296/79, 80, 83, 138, 145; 280/DIG. 5
See application file for complete search history.

(56) References Cited

U.S. PATENT DOCUMENTS

| | | | | |
|---|---|---|---|---|
| 3,709,553 | A * | 1/1973 | Churchill | B60J 11/00 16/87.4 R |
| 5,788,317 | A * | 8/1998 | Nation | B60J 5/0487 150/166 |
| 6,158,801 | A * | 12/2000 | Tucker | B60J 5/0487 296/146.1 |
| 8,312,911 | B2 * | 11/2012 | Haagenson | B60J 5/0487 160/330 |
| 2010/0276961 | A1 * | 11/2010 | Haagenson | B60J 5/06 296/83 |

* cited by examiner

*Primary Examiner* — Jason S Morrow
*Assistant Examiner* — E. Turner Hicks
(74) *Attorney, Agent, or Firm* — Woods Oviatt Gilman LLP; Katherine H. McGuire, Esq.

(57) ABSTRACT

A golf cart enclosure system for a golf cart having a passenger cabin, a roof mounted on a frame for covering the passenger cabin and a front windshield. The system comprises a guide rail secured to the frame proximate the roof and a panel of a length sufficient to extend from the guide rail to the golf cart passenger cabin below. A plurality of swivel rollers is provided, wherein a first end of the swivel roller rollably engages the guide rail and wherein a second end of the swivel roller is fastened to the panel. The panel slidably moves along the guide rail from a closed position where the panel is fully extended to an open position where the panel is retracted.

7 Claims, 11 Drawing Sheets

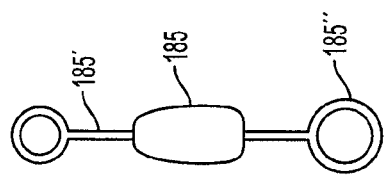
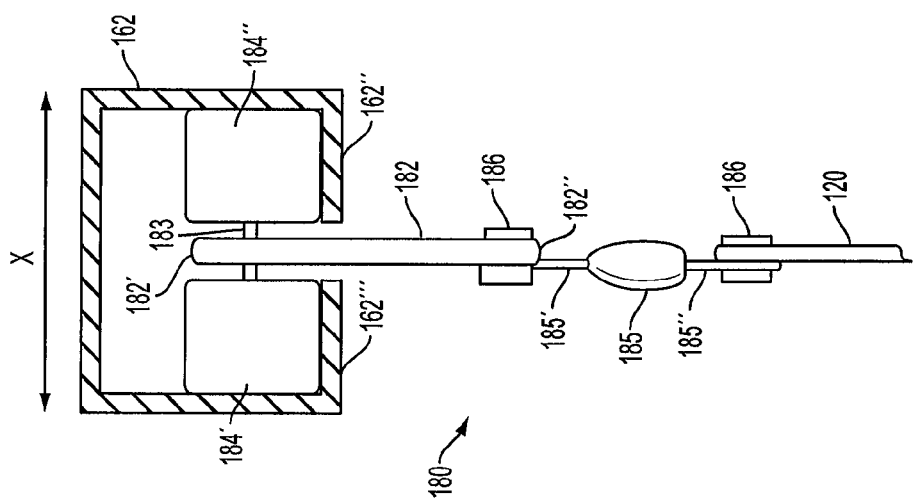

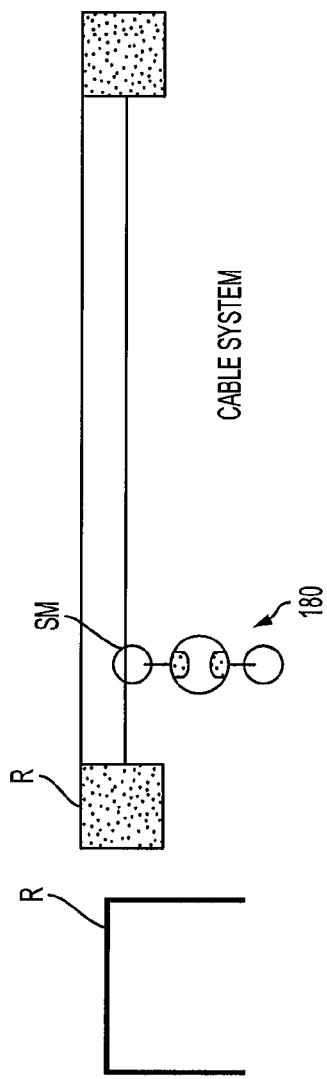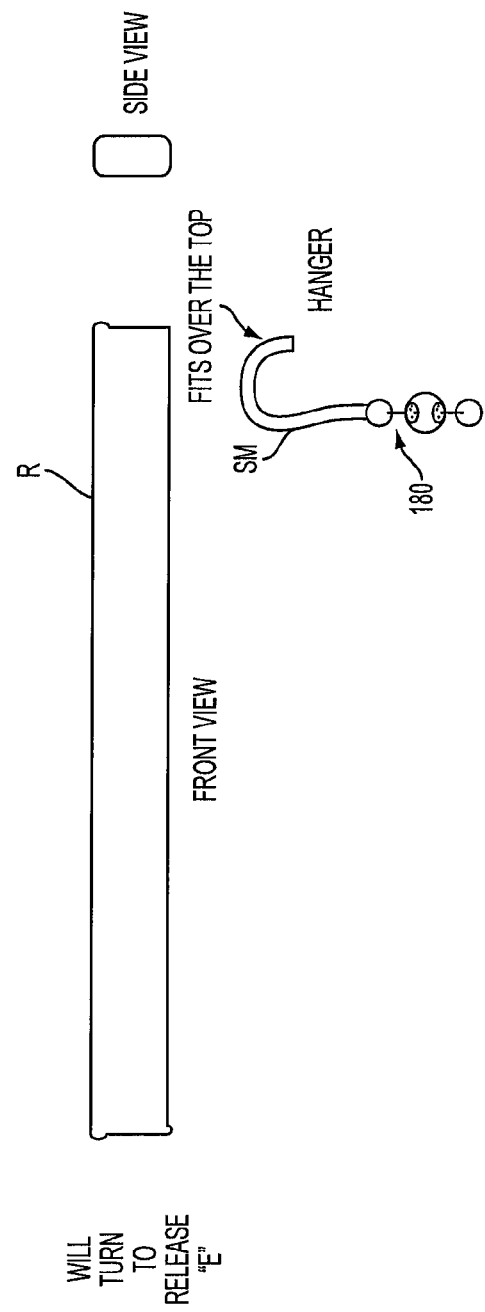

DOUBLE BEARING/ROLLER

DOUBLE WHEEL TOP, BOTTOM OR SIDE MOUNT

SINGLE SIDE VARIABLE MOUNTING

GOLF CART ENCLOSURE

This application is a continuation of U.S. patent application Ser. No. 14/733,322 filed Jun. 8, 2015 which is a continuation of U.S. patent application Ser. No. 14/516,024 filed Oct. 16, 2014 and is related to Provisional Patent Application Ser. No. 61/891,614 filed on Oct. 16, 2013 and is incorporated herein by reference.

FIELD OF THE INVENTION

The present invention relates to a golf cart enclosure, and more particularly, to a sliding panel golf cart enclosure to be used during inclement weather to protect persons within the enclosure from such weather. Specifically, the present invention relates to a sliding panel golf cart enclosure wherein the golf cart is equipped with panel mounting rails where each rail is adapted to slidably carry a panel through a swivel fastener.

BACKGROUND OF THE INVENTION

Golf carts are generally designed to carry two persons (golfers) within a cabin portion of the cart while a platform positioned behind the cabin portion carries each person's golf bag and golf clubs. Many golf carts are further outfitted with a roof and a windshield. Golf carts, however, are generally designed to have no doors or other impediments along the sides of the cart. This lack of doors is intentional as it allows for quick and easy ingress into and egress from the cabin while playing a round of golf. One drawback to this open design, however, is the inability to control or limit golfer exposure to inclement weather and/or insects. Thus, numerous systems exist in the art which retrofit golf carts to be more weather/insect repellant. Each of these systems, unfortunately, suffers from a number of setbacks.

One example of a system for weather- and/or insect-proofing a golf cart includes the provision of a roll-up barrier. These roll-up systems generally include a vinyl or other clear plastic panel fixedly secured to the frame structure of the golf cart which supports the roof. When in use, the panel drapes downwardly to cover the open sides of the golf cart passenger cabin. When not in use, the panels are rolled upwardly to be collected and secured to the roof frame so as to allow quick and easy access to the passenger cabin. A significant drawback to these roll-up systems, however, is the entrapment of moisture within the panel when in the rolled condition. This moisture leads to the buildup of mildew.

Alternative systems have been developed to overcome the mildew problems associated with roll-up panels. These alternative systems generally employ one or more panels which slide horizontally along a track situated above, and in some cases below, the side openings of the golf cart's passenger cabin. When not in use, these panels slide laterally towards the back of the golf cart where they are then secured from closing unintentionally. One example of a horizontally sliding enclosure includes clear panels constructed of relatively thick plastic. This example can be thought of as being similar to conventional shower doors where a first panel passes in front of (or behind) a second panel. Another similar example of a sliding enclosure includes a generally thin panel of clear plastic. This example is generally similar to a conventional shower curtain which can be displaced laterally by bunching the plastic panel together. In each of these examples, however, ease of admission to the passenger cabin of the golf cart is restricted by the presence of the panel when the panel is not in use. One attempt to alleviate the bunching of a thin panel has been to split the panel into thin strips with successive strips splined together via rigid vertical members. In this manner, the constructed panel is able to fold compactly so as to minimize obstruction of the cabin opening. However, when in an extended position, such as during inclement weather, the vertical members obstruct the view of the cart driver and pose a safety hazard. Further, the provision of the vertical members and spline increases cost of production while increasing points of possible enclosure failure through stress and wear.

As such, there is a need for a golf cart enclosure which provides protection from the elements when needed but that also retracts to a generally compact bundle when not in use. There is a need for a golf cart enclosure that provides maximum viewability to the occupants of the golf cart when the enclosure is being employed but that also retracts compactly so as not to hinder ingress into or egress from the golf cart passenger cabin when the enclosure is unneeded.

BRIEF SUMMARY OF THE INVENTION

In general, one embodiment the present invention is directed to a golf cart enclosure that provides a barrier along the sides and back of a golf cart passenger cabin. The golf cart enclosure generally consists of a number of clear plastic panels which drape from a support structure situated proximate the roof frame of the golf cart. In further embodiments, the enclosure may consist of a number of two-part panels wherein the lower portion of each panel is constructed of a durable fabric, such as marine grade canvas while the upper portion is constructed of a clear plastic material such as polyethylene or vinyl sheeting. The enclosure is selectively retractable along the support structure such that one or more panels can be withdrawn from covering the door opening to the passenger cabin and/or the back "window" above the seat bench. The panels are mounted to the support structure by swiveling rollers such that the retracted panel does not impede ingress into or egress from the passenger cabin.

Accordingly, in one embodiment of the present invention, a golf cart enclosure system for a golf cart having a passenger cabin, a roof mounted on a frame for covering the passenger cabin and a front windshield is disclosed. The system comprises a guide rail secured to the frame proximate the roof and a panel of a length sufficient to extend from the guide rail to the golf cart passenger cabin below. A plurality of swivel rollers is provided, wherein a first end of the swivel roller rollably engages the guide rail and wherein a second end of the swivel roller is fastened to the panel. The panel slidably moves along the guide rail from a closed position where the panel is fully extended to an open position where the panel is retracted.

The embodiments of the present invention are well-suited to provide protection from inclement weather and/or insects when deployed while also compactly stowing when not in use so as not to hinder access to the golf cart passenger cabin.

Additional objects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein:

FIG. 8A is an detailed cross sectional view of a swivel roller used with a golf cart enclosure according to an embodiment of the present invention;

FIG. 8B is an expanded view of a swivel member used with a golf cart enclosure according to an embodiment of the present invention; and FIGS. 9-17 are simplified views showing alternate embodiments of guide rails and associated panel sliding mechanisms.

DETAILED DESCRIPTION OF THE INVENTION

Figure 1:
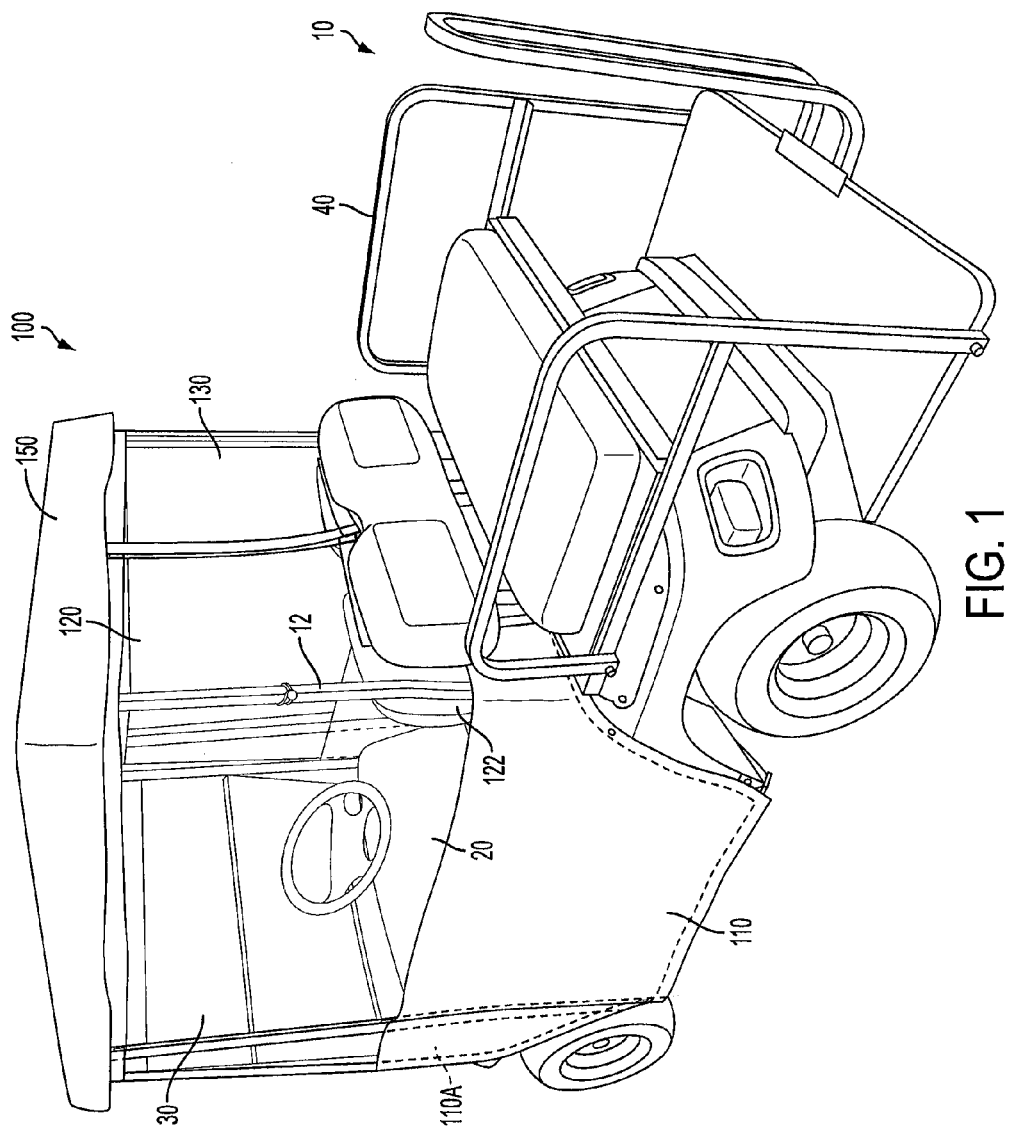
FIG. 1 is a perspective view of a golf cart with an employed golf cart enclosure according to an embodiment of the present invention.
Figure 2:
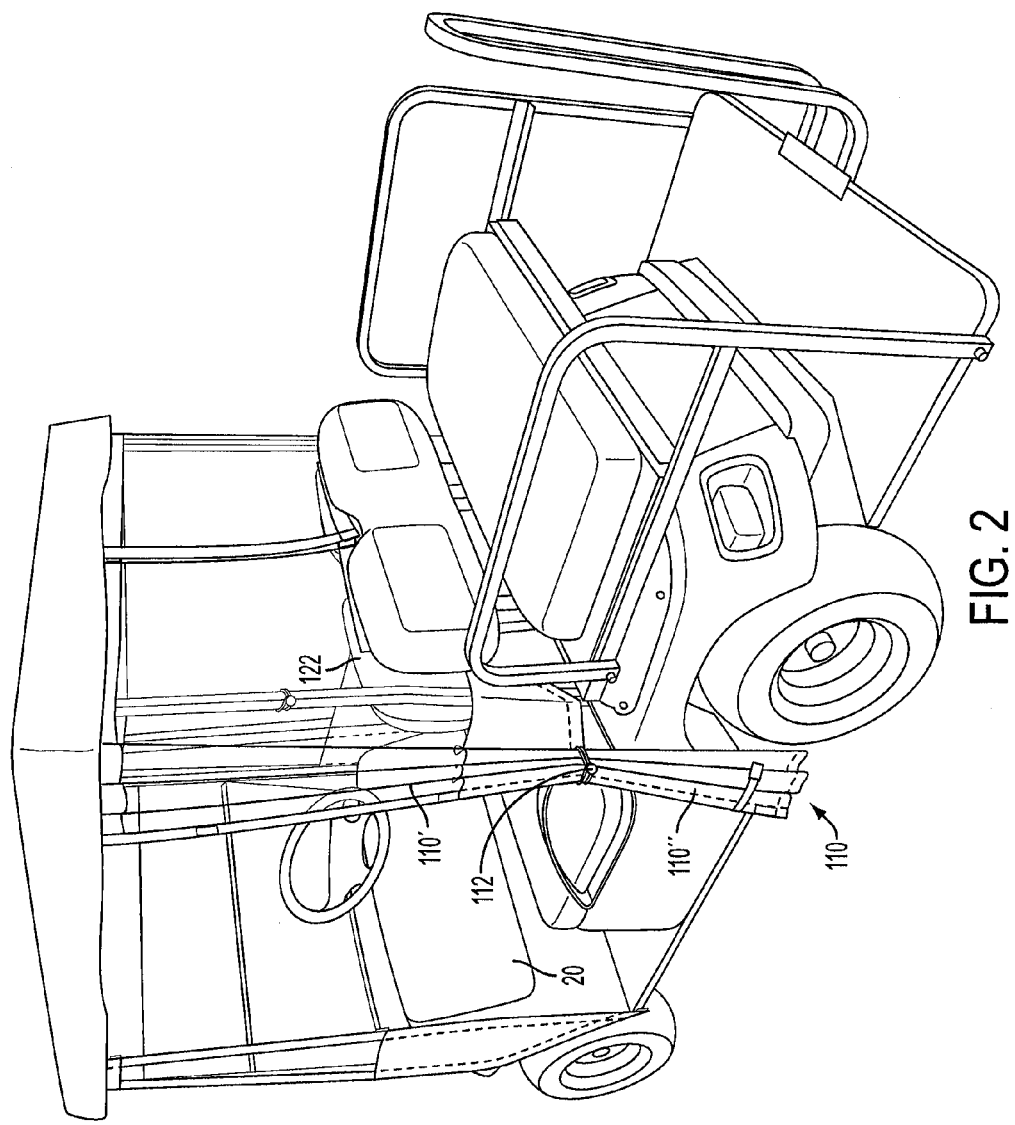
FIG. 2 is a perspective view of a golf cart with a retracted side panel of a golf cart enclosure according to second embodiment of the present invention.
Figure 3:
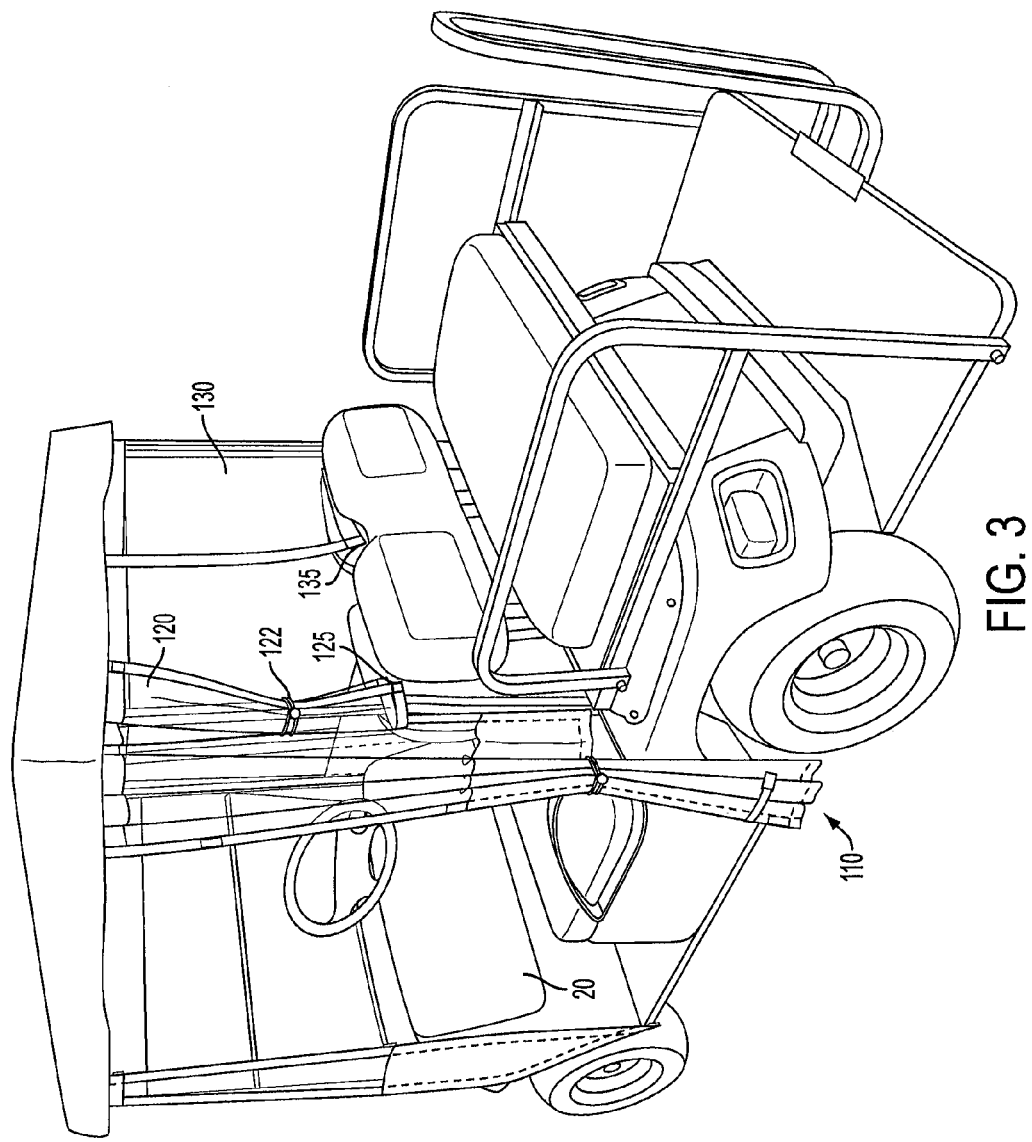
FIG. 3 a perspective view of a golf cart with a retracted side panel and retracted back panel of a golf cart enclosure according to an embodiment of the present invention.

Referring to the drawings in detail, and specifically to FIGS. 1-3, a golf cart 10 is equipped with an embodiment of a golf cart enclosure 100 in accordance with the present invention. Golf cart 10 generally includes a passenger compartment 20 equipped with a bench for seating of passengers, as well as operational controls (steering wheel, brake pedal, acceleration pedal, etc.) to operate the golf cart. To the rear of the passenger compartment 20 is a platform area 40 for securing a golf bag and clubs for use during a round of golf. Optionally, platform area 40 may include a further bench to provide additional passenger seating. Many golf carts also include a frame 12 for mounting a roof 50 (see FIGS. 5-7). Further included may be a windshield 30 mounted to frame units 12.

As explained above, golf carts are not typically constructed to have an enclosed passenger compartment, but are rather open-sided and open-backed. Thus, during inclement weather, or should insects be particularly bothersome, passengers in the passenger compartment 20 are left open to the adverse environment. Golf cart enclosure 100 is designed and mounted so as to minimize, if not eliminate altogether, the negative effects of poor environmental conditions.

Golf cart enclosure 100 is generally comprised of one or more panels 110, 120, 130 which have sufficient length to extend from the roof to the body of the golf cart. As shown in perspective, side panel 110 generally covers the left hand side of the cart and may incorporate rear panel 120 to form a continuous single panel unit. Similarly, and not referenced by a reference numeral, a right side panel generally covers the right hand side of the cart and may incorporate rear panel 130 into a single panel unit. Panel unit 110A may also be included to compensate for the angle created by the forward frame while creating a generally perpendicular rear edge with respect to the roofline/cart floor. An optional canopy 150 may also be included which is intended to cover the hardware associated with the golf cart enclosure which will be discussed in more detail with reference to FIGS. 5-7.

As can be seen by FIGS. 1 and 2, side panel 110 is configured to cover the left hand side of golf cart 10. When in a closed position (FIG. 1) side panel 110 extends generally from rear frame member 12 forward to the perpendicular edge created by panel 110A. Retraction of side panel 110 (FIG. 2) exposes passenger compartment 20 allowing for efficient ingress into or egress out of the compartment. When retracted, side panel 110 may be releasably secured by fastener 112. Fastener 112 may be any suitable fastener, such as clips, snaps, hook and loop material, and is preferably a tie-back strap or toggle strap. As further shown in FIG. 2, side panel 110 may be manufactured as a two piece construction. The two piece construction includes a generally clear plastic top portion 110' and a robust fabric bottom portion 110". Top portion 110' is preferably a clear plastic such as vinyl or polyethylene. Bottom portion 110" is preferably a marine grade canvas material which would resist tearing and puncturing such as from multiple retractions and extensions of the panel or from abuse from passengers, such as from golf spikes or driving the cart through wooded areas were limbs may impinge upon the panel.

With reference to FIG. 3, rear panel 120 is shown in a retracted position. As discussed above with regard to side panel 110, rear panel 120 may be secured in an open position by any suitable fastener, such a toggle strap 122. Rear panel 120 is also provided with one or more fasteners 125 which mate with fastener 135 of rear panel 130. Thus, when both rear panels 120 and 130 are in a closed position (FIGS. 1 and 2) the mating fasteners 125/135 serve to secure to two panels together. Examples of suitable fasteners include respective male and female counterparts of clips, snaps, buttons, hook and loop, and zippers, with said fasteners preferably being hook and loop fasteners. As described above, rear panel 120 may be incorporated with side panel 110 to form one continuous panel unit. Rear panel 130 may similarly form a continuous panel with the right side panel (not enumerated). Alternatively, rear panels 120 and 130 may each be distinct panel units apart from the side panels, or further, rear panels 120 and 130 may be manufactured as a single continuous rear panel thereby obviating the need for mating fasteners 125/135.

Figure 4:
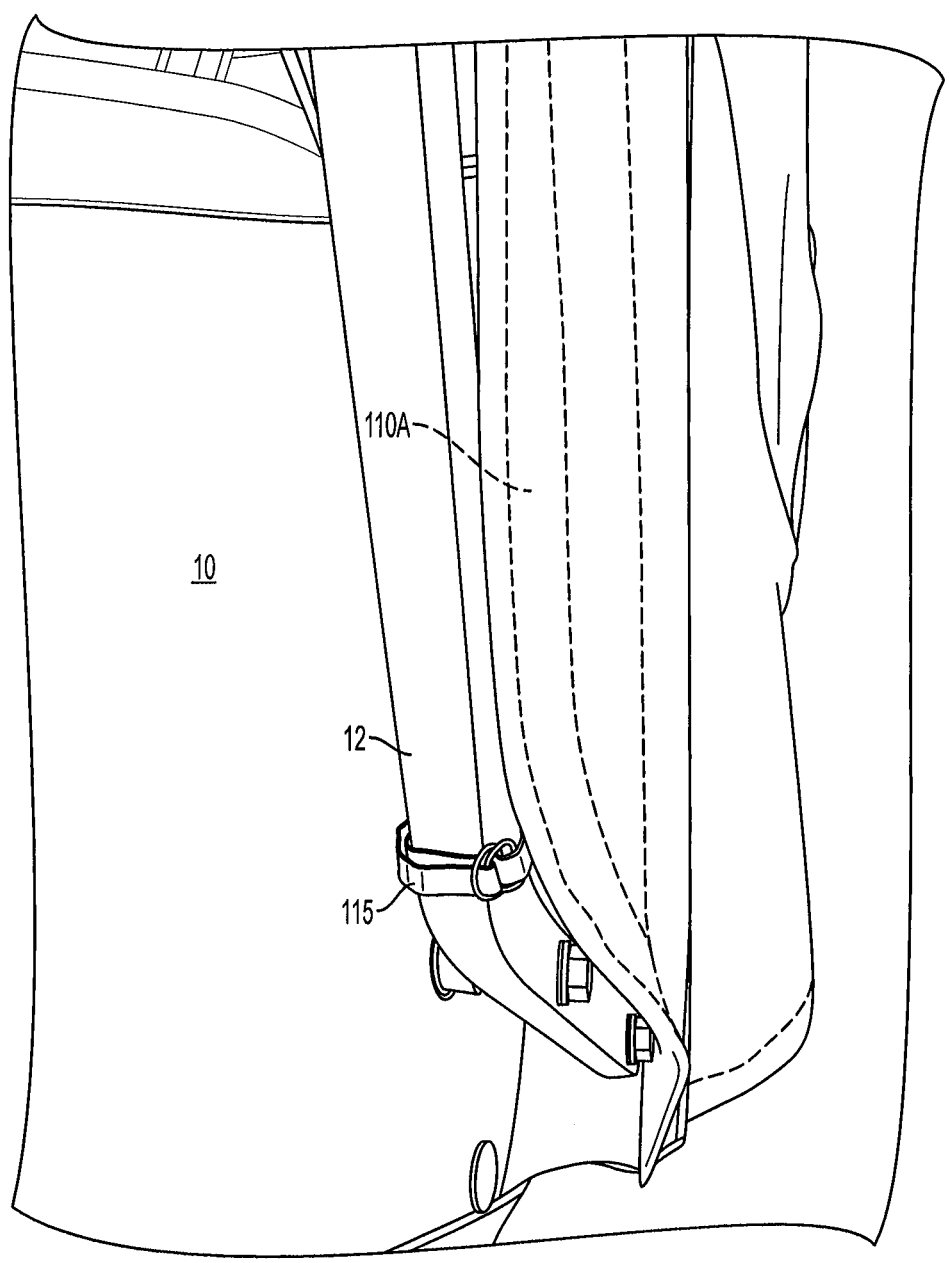
FIG. 4 is an expanded view of a panel fastener used with a golf cart enclosure according to an embodiment of the present invention.

FIG. 4 is a representative view of a mechanism for mounting the forward edge of panel 110A to a golf cart frame unit 12. Panel 110A is equipped with a fastener 115 which removably mounts the panel to the frame. In a preferred embodiment, fastener 115 is a double D-ring strap having a first strap with D-rings fixedly secured to the panel 110A. A second strap is similarly secured to the panel with its free end passing through and around the two D-rings so as to cinch the panel to the frame. While preferably a double D-strap fastener, it would be appreciated by those skilled in the art that any suitable fastener may be employed. It should also be stated, for purposes of clarification, that fastener 115 is generally located on the lower portion of the panel and is meant to prevent lifting of the panel from the bottom. The top portion of each panel is secured to a guide rail as will be discussed in greater detail with regard to FIGS. 5-7. Also, while shown and described as mounting panel 110A to a front frame member 12, similar fasteners are positioned at suitable locations on the remainder of the panels as desired or required.

Figure 5:
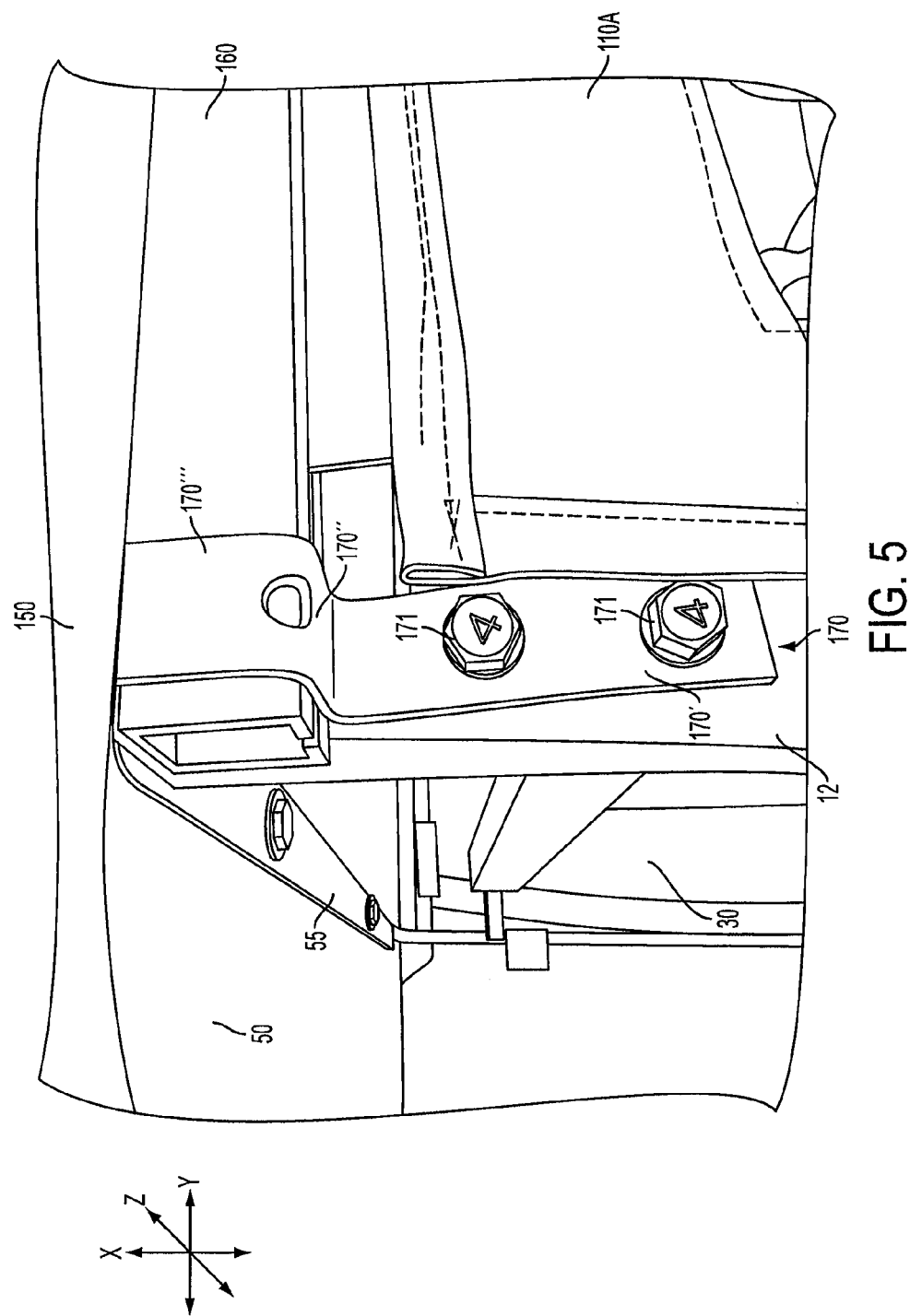
FIG. 5 is an expanded view of a front guide rail bracket used with a golf cart enclosure according to an embodiment of the present invention.
Figure 6:
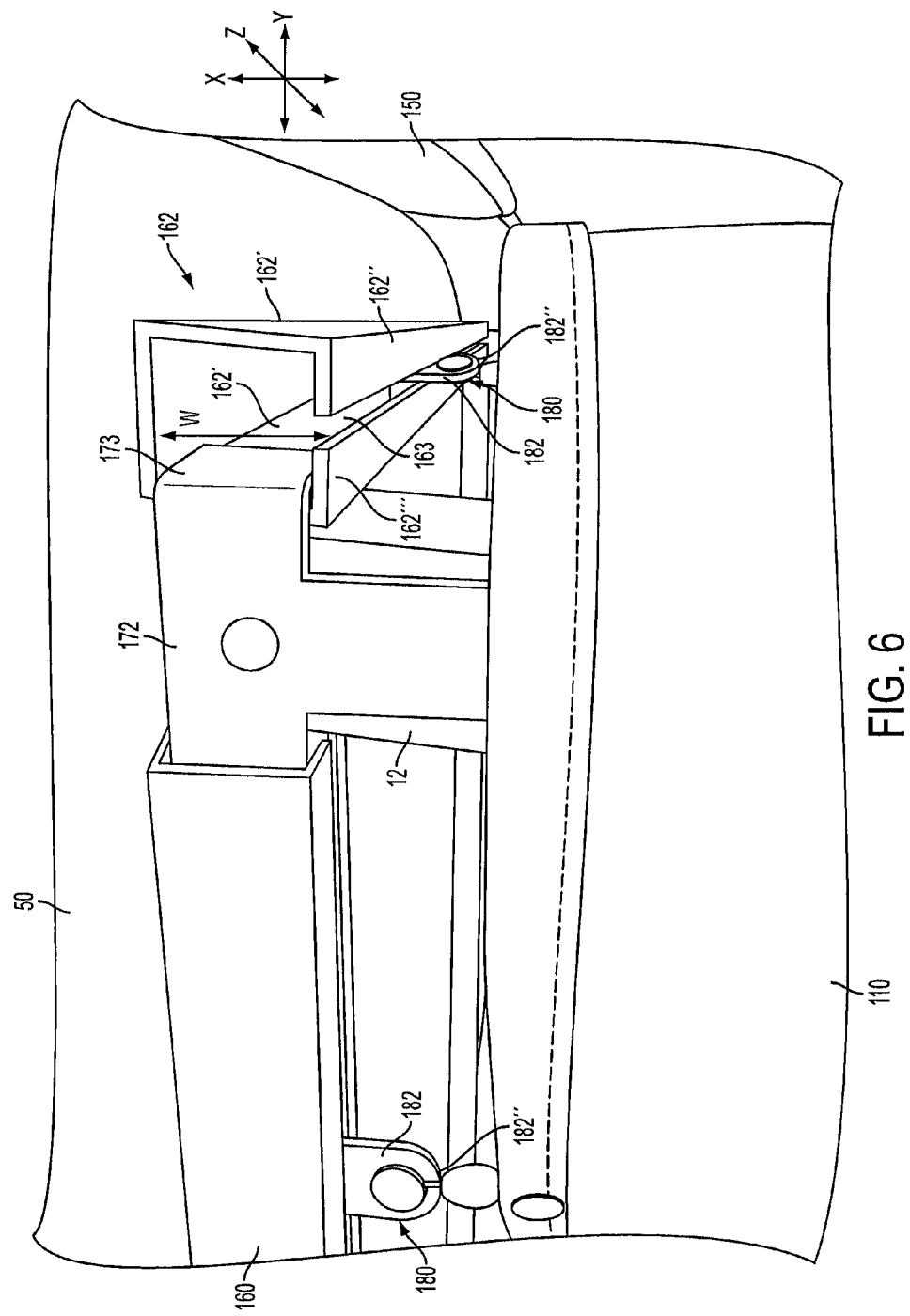
FIG. 6 is an expanded view of a rear guide rail bracket with panels in the extended position.
Figure 7:
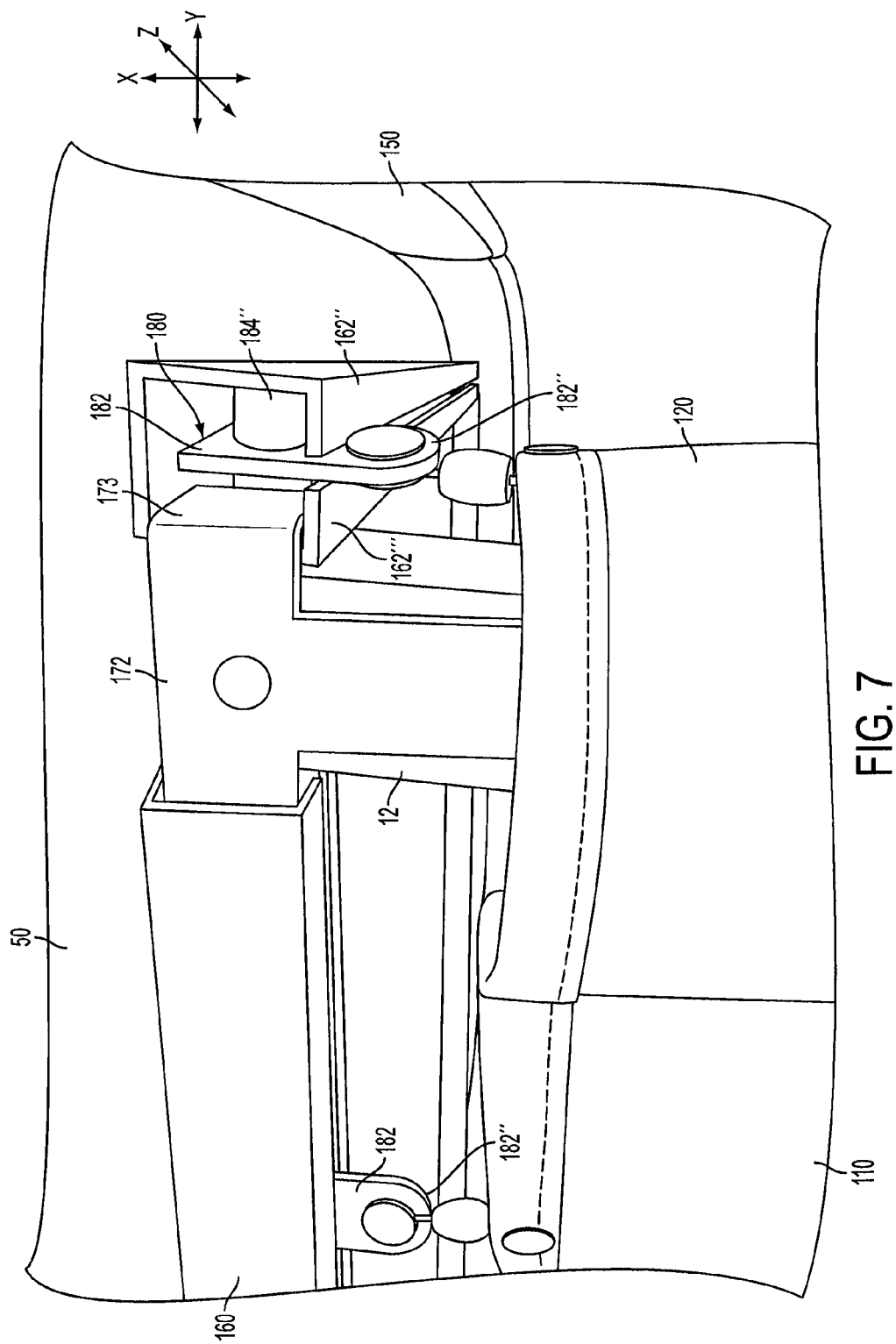
FIG. 7 is an expanded view of a rear guide rail bracket with a panel in the retracted position.
Figure 13:
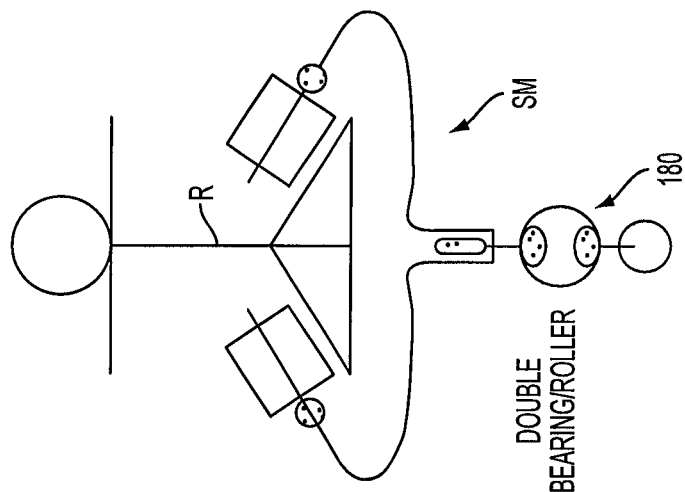
Figure 12:
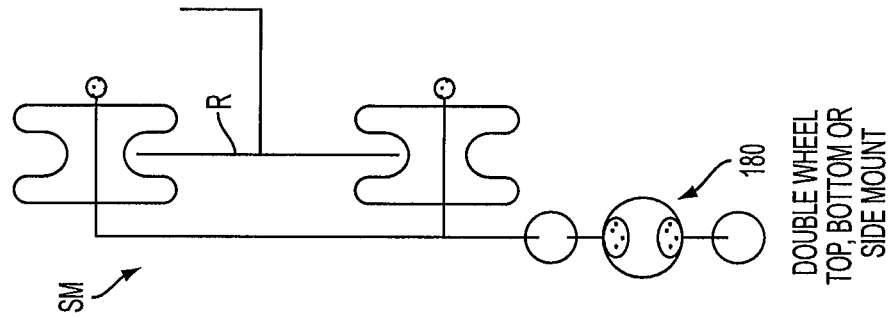
Figure 11:
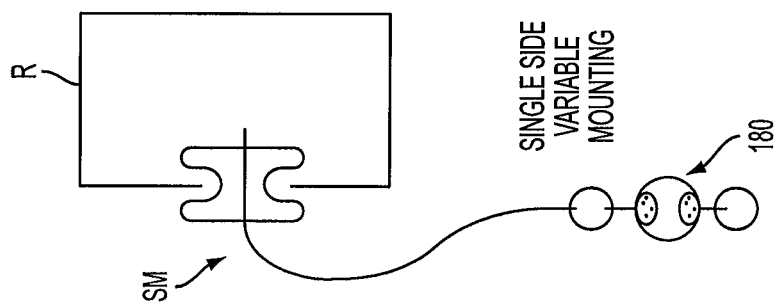
Figure 16:
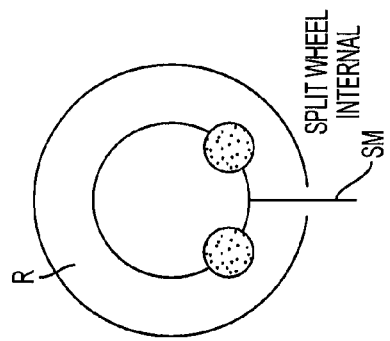
Figure 17:
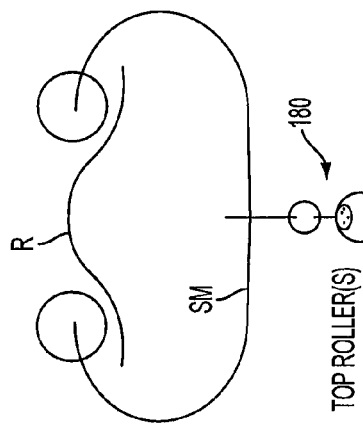
Figure 15:
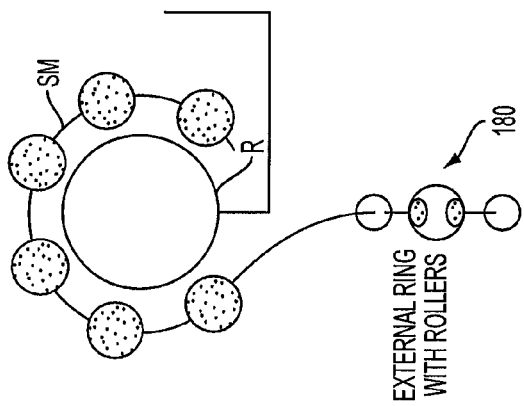
Figure 14:
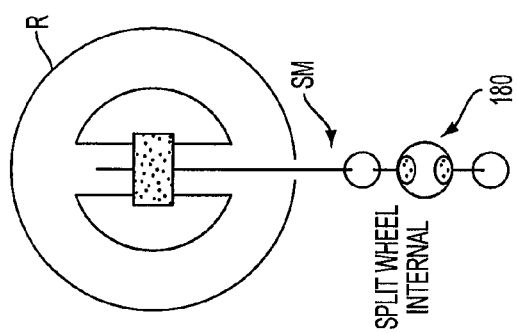

FIG. 5 shows an expanded view of the mounting of the forward end of a guide rail 160 utilized in the golf cart enclosure 100 of the present invention. Guide rail 160 is generally mounted proximate roof 50 of the golf cart. Roof 50 is typically mounted to frame unit 12 through roof strap 55. Bent bracket 170 is secured to frame member 12, preferably by bolts or lag screws 171. Bent bracket 170 is configured to have a flat portion 170' which rests against and is secured to frame member 12. A generally perpendicular bend portion 170" extends outwardly from frame member 12 and is selected to have a length equal to or slightly larger than the width of guide rail 160. Finally, bent bracket 170 includes a further portion 170''' which extends upwardly in a plane generally parallel with flat portion 170' but displaced outwardly from frame member 12 by the length of 170". In this manner, guide rail 160 is constrained in the x-direction between bent bracket portion 170" and roof 150 and between bent bracket portion 170''' and frame unit 12 in the z-direction. Travel in the y-direction is prevented through friction between the guide rail and the bent bracket 170. Optionally, guide rail 160 may be secured in the z-direction by fastening it to the bent bracket or frame unit by a suitable fastener, such as a screw or bolt. Side panel 110A is mounted within the guide rail and allowed to drape downwardly as shown in FIGS. 1-3. In an alternate embodiment, 172 is omitted and the bars 160 and 162 are attached to each other directly FIGS. 6 and 7 are detailed views of the guide rails used for retracting and extending the panels. As can be seen in FIGS. 6 and 7, by way of example, with such discussion meant to encompass each guide rail employed by the present invention, guide rail 162 has a generally square c-shaped cross section. Guide rail 162 has generally parallel opposing sides 162' and bottom members 162" and 162''' forming a groove 163 therebetween. Swivel rollers 180 are rotatably secured within the guide rail 162 and include a portion which extends through groove 163, with such portion fastened to a panel 110/120/130.

Further shown in FIGS. 6 and 7 is a mounting bracket 172 used to secure guide rails 160 and 162 to the golf cart at a rear frame member 12. Mounting bracket 172 is a generally T-shaped bracket wherein a portion of one horizontal arm of the T is bent at a generally 90° angle. The vertical portion of the T-shaped mounting bracket 172 is secured to the frame member 12. As shown, the left hand horizontal arm of the T-shaped bracket extends into the interior opening of guide rail 160 where the arm secures the guide rail against the frame member 12. The bent portion 173 of the right hand horizontal arm secures guide rail 162 to the frame. Bracket 172 is positioned on the frame member 12 such that bent portion 173 engages the open portion of guide rail 162 and impinges a side wall 162' against frame member 12, thereby constraining movement in the y-direction. The width of the horizontal arms of bracket 172 is selected to be slightly smaller than the width W of guide rail 162 such that bracket 172 fits snugly within the guide rail. This snug fit, in conjunction with the roof 50, prevent guide rail displacement in the x-direction. While not shown or described, the opposing side of the golf cart is similarly equipped with guide rails and brackets as discussed with above with regard to FIGS. 5-7. Thus, the two rear T-shaped brackets, in combination serve to prevent movement of the guide rail 162 in the z-direction. Panels 110/120/130 are draped from the guide rails by swivel rollers 180. Optional canopy 150 is mounted to the roof and serves to hide or obscure the guide rails and swivel rollers 180 from casual view.

Turning now also to FIGS. 8A and 8B, swivel rollers 180 of the present invention generally comprise a tab 182 having a top end 182' and a bottom end 182". A pair of roller bearings 184' and 184" is rotatably mounted on an axle 183. Axle 183 extends through the tab 182 proximate the top end 182' with roller bearing 184' situated on one side of the tab 182 and roller bearing 184" located on the other side of tab 182. Swivel member 185 is situated below the tab 182 with the swivel member 185 being attached to the tab by way of a tang 185'. Swivel member 185 further includes a tang 185" which is attached to a respective panel 110/120/130. Preferably, each tang 185" may be attached to its respective tab or panel through use of a rivet 186, for example. The number and location of swivel rollers 180 positioned along the top of a panel may vary and is selected to control the size of the bundled panel when in the open position as well as the width of each fold of that bundle. More swivel rollers leads to a shorter width of each fold but a wider resultant bundled panel.

Roller bearings 184' and 184" rest upon and are rotatably moveable across the inner surface of guide rail bottom members 162''' and 162", respectively. Ideally, the total width of roller bearings 184', 184", axle 183 and tab 182 is such that lateral movement of the swivel roller in the y-direction is minimized. The roller bearings minimize friction to ensure quiet and essentially effortless sliding of a panel between an open or closed position requiring the use of only a single finger to slide it along. Swivel member 185 allows the panel to swivel with respect to the roller elements and further allows the panel to compact into a tight bundle when the panel is retracted to an open condition allowing golfer ingress and egress to and from the cart. This compact bundle afforded by the swivel member provides greater accessibility to the passenger cabin 20 when a side panel is open as compared to panels generally known in the art.

FIGS. 9-14 are simplified views illustrating alternate embodiments of guide rails "R" and associated sliding mechanisms "SM" which may be attached to the panels.

Although the present invention has been described in considerable detail with reference to certain aspects thereof, other versions are possible. For example, and not by way of limitation, the framework which attaches to the cart may be modified as desired. Therefore, the spirit and scope of the appended claims should not be limited to the description of the aspects contained herein.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method for enclosing the passenger cabin of a golf cart having a roof mounted on a frame and a front windshield, the method comprising the steps of:
   a) providing and securing a guide rail to the frame proximate the roof;
   b) providing a panel of a length sufficient to extend from the guide rail to the golf cart passenger cabin below; and
   c) providing a plurality of swivel rollers, wherein a first end of the swivel roller rollably engages the guide rail and wherein a second end of the swivel roller is fastened to the panel, wherein the swivel roller comprises:

a) a tab having a top end and a bottom end;

b) a pair of roller bearings rotatably mounted on an axle, wherein the axle extends generally orthogonally through the tab proximate the top end and wherein the roller bearings are positioned on respective sides of the tab in a plane substantially parallel with the tab; and c) a swivel member having an upper tang and a lower tang wherein each tang swivels independent of the other and wherein the upper tang is attached to the bottom end of the tab and the lower tang is attached to the panel, wherein the panel slidably moves along the guide rail from a closed position where the panel is fully extended to an open position where the panel is retracted.

2. The method of claim 1 wherein the guide rail has a generally c-shaped cross section wherein the open portion of the guide rail faces downwardly.

3. The method of claim 2 wherein the first end of the swivel roller includes a pair of roller bearings with each respective roller bearing rollably engaged with a respective arm of the c-shaped cross section guide rail.

4. The method of claim 1 wherein the second end of the swivel roller is fixedly fastened to the panel by a rivet.

5. The method of claim 1 wherein the second end of the swivel roller is releasably fastened to the panel.

6. The method of claim 1 wherein the panel is a clear plastic sheet.

7. The method of claim 1 wherein the panel has a two-piece construction wherein the top portion of the construction is a clear plastic sheet and the bottom portion of the construction is a canvas.

* * * * *